(12) United States Patent
Hayashi

(10) Patent No.: US 12,044,300 B2
(45) Date of Patent: Jul. 23, 2024

(54) CORRECTED GEAR AND METHOD FOR CORRECTING GEAR

(71) Applicant: ISUZU MOTORS LIMITED, Tokyo (JP)

(72) Inventor: Kengo Hayashi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 546 days.

(21) Appl. No.: 17/280,389

(22) PCT Filed: Sep. 25, 2019

(86) PCT No.: PCT/JP2019/037458
§ 371 (c)(1),
(2) Date: Mar. 26, 2021

(87) PCT Pub. No.: WO2020/067091
PCT Pub. Date: Apr. 2, 2020

(65) Prior Publication Data
US 2022/0034393 A1    Feb. 3, 2022

(30) Foreign Application Priority Data
Sep. 28, 2018   (JP) .................. 2018-183445

(51) Int. Cl.
*F16H 55/17*    (2006.01)
*F16H 57/00*    (2012.01)

(52) U.S. Cl.
CPC ......... *F16H 55/17* (2013.01); *F16H 57/0006* (2013.01)

(58) Field of Classification Search
CPC ...... F16H 55/17; F16H 57/0006; F16H 55/24; F16H 2001/327; F16H 1/2818; F16H 15/54
See application file for complete search history.

(56) References Cited

U.S. PATENT DOCUMENTS

| | | | |
|---|---|---|---|
| 1,852,538 A | 10/1929 | Peterson | |
| 4,722,723 A | 2/1988 | Andersen | |
| 2006/0060414 A1* | 3/2006 | Kuroumaru | B62D 7/224 180/444 |
| 2007/0277643 A1* | 12/2007 | King | F16H 55/17 74/572.2 |

(Continued)

FOREIGN PATENT DOCUMENTS

| | | |
|---|---|---|
| CN | 101929527 A | 12/2010 |
| DE | 102005044678 A1 | 9/2004 |

(Continued)

OTHER PUBLICATIONS

German Patent and Trademark Office, Office Action, Application No. DE 11 2019 004 846.5, dated May 19, 2022, in 12 pages.

(Continued)

*Primary Examiner* — Zakaria Elahmadi
(74) *Attorney, Agent, or Firm* — PROCOPIO, CORY, HARGREAVES & SAVITCH LLP

(57) ABSTRACT

With respect to a gear (10) having an outer circumferential surface (16) on which a tooth profile (14) is formed and an inner circumferential surface (12), a diameter of the outer circumferential surface (16) of the gear (10) in the radial direction is corrected by press fitting an inner ring (20) into the inner circumferential surface (12).

6 Claims, 5 Drawing Sheets

(56) References Cited

U.S. PATENT DOCUMENTS

| | | | |
|---|---|---|---|
| 2007/0277644 A1* | 12/2007 | King | F16D 1/076 74/572.2 |
| 2010/0319484 A1 | 12/2010 | Kanai | |
| 2014/0157929 A1* | 6/2014 | Yin | F16D 3/77 219/113 |
| 2016/0319903 A1* | 11/2016 | Juan Lien Chang | F16H 55/17 |
| 2018/0266517 A1* | 9/2018 | Yin | F16F 15/30 |
| 2020/0016688 A1* | 1/2020 | Wilson | F16H 55/06 |
| 2021/0054916 A1* | 2/2021 | Juan Lien Chang | F16D 3/79 |

FOREIGN PATENT DOCUMENTS

| | | | | |
|---|---|---|---|---|
| EP | 2520831 A1 * | 11/2012 | | F16H 55/17 |
| EP | 2520831 A1 | 11/2012 | | |
| JP | 2001-269815 A | 10/2001 | | |
| JP | 2002235836 A | 8/2002 | | |
| JP | 2016-083746 A | 5/2016 | | |
| KR | 2017-0080160 A | 7/2017 | | |
| WO | 2011080824 A1 | 7/2011 | | |
| WO | 2015097919 A1 | 7/2015 | | |

OTHER PUBLICATIONS

International Search Report and Written Opinion for related PCT App No. PCT/JP2019/037458 dated Oct. 29, 2019, 8 pgs.(partial translation).

Notification of the First Office Action, Chinese Patent Application No. 201980064119.6, dated Apr. 28, 2023, in 12 pages.

* cited by examiner

CORRECTED GEAR AND METHOD FOR CORRECTING GEAR

CROSS-REFERENCE TO RELATED APPLICATIONS

This application is a U.S. National Stage entry of PCT Application No: PCT/JP2019/037458 filed Sep. 25, 2019, which claims priority to Japanese Patent Application No. 2018-183445 filed Sep. 28, 2018, the contents of which are incorporated herein by reference.

TECHNICAL FIELD

The present disclosure relates to a corrected gear and a method for correcting gear.

BACKGROUND ART

Over Ball Diameter (OBD) is known as an index for managing a size of a gear. OBD is a distance measured over two balls placed in tooth grooves located at both ends of a diameter of a gear (see, for example, Patent Literature 1).

CITATION LIST

Patent Literature

Patent Literature 1: WO 2015/097919 A1

SUMMARY OF INVENTION

Technical Problem

In general, a gear is manufactured by cutting teeth from a raw material having a predetermined shape and further performing heat treatment such as quenching and tempering. For this reason, the OBD may vary due to a deviation in the shape, dimension, or the like of a tooth profile due to a variation in manufacturing conditions or the like. Therefore, there is a limit in reducing the variation in the OBD with the gear alone.

An object of the technique of the present disclosure is to reduce a variation in an OBD of a gear.

Solution to Problem

A technique according to the present disclosure relates to a corrected gear including: a gear having an outer circumferential surface on which a tooth profile is formed and an inner circumferential surface; and an insert that corrects a diameter of the outer circumferential surface of the gear in a radial direction by being press fitted into the inner circumferential surface of the gear.

It is preferable that the insert is preferably an annular inner ring having an outer diameter larger than a diameter of the inner circumferential surface.

Further, the technique according to the present disclosure relates to a method for correcting gear, the method including: with respect to a gear having an outer circumferential surface on which a tooth profile is formed and an inner circumferential surface, correcting a diameter of the outer circumferential surface of the gear in a radial direction by press fitting, into the inner circumferential surface, an annular inner ring having an outer diameter larger than a diameter of the inner circumferential surface.

It is preferable that, in the press fitting, the gear is heated at a predetermined temperature to make the diameter of the inner circumferential surface larger than the outer diameter of the inner ring, and then, the inner ring is inserted into the inner circumferential surface and cooled.

Further, it is preferable that, in a case where there are a plurality of gears whose OBD deviation value, which is a value of deviation of an OBD measurement value from a set OBD target value, is negative, an OBD maximum increase amount due to press-fitting deformation is determined in advance by OBD calculation based on a model, and the press fitting is performed to a gear whose OBD deviation value is further on a negative side than a value obtained by making the OBD maximum increase amount negative.

Advantageous Effects of Invention

According to the technique of the present disclosure, a variation in an OBD of a gear can be reduced.

DESCRIPTION OF EMBODIMENTS

Figure 1:
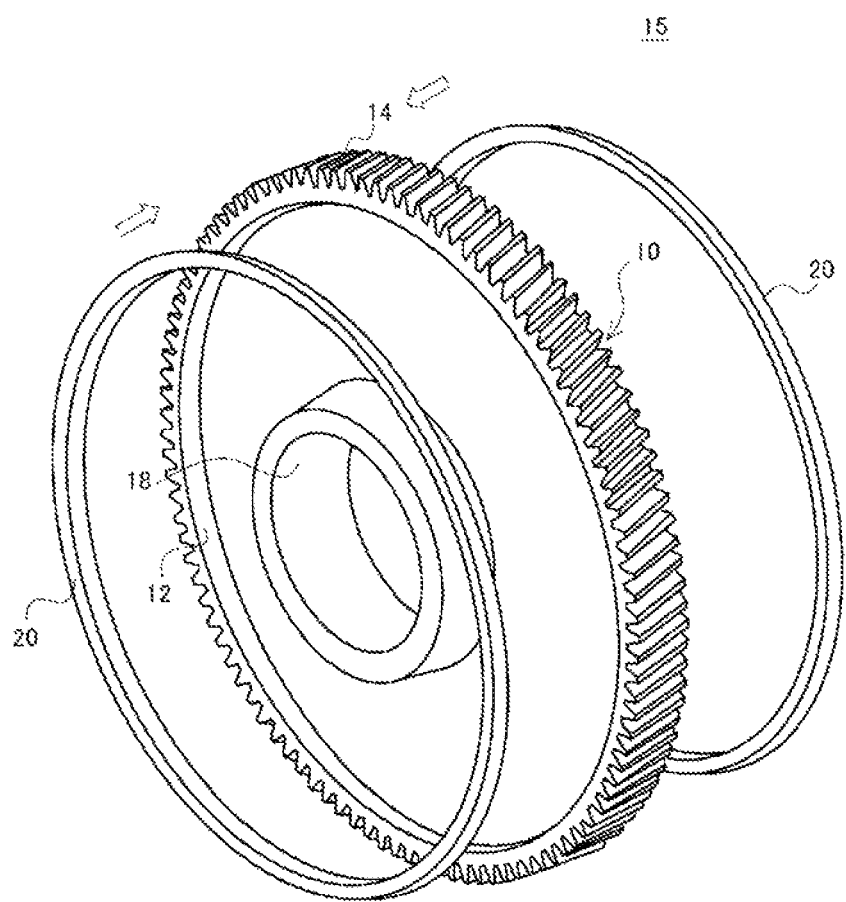
FIG. 1 is a perspective view showing a corrected gear according to the present embodiment.

Hereinafter, a corrected gear and a method for correcting gear according to the present embodiment will be described with reference to the accompanying drawings. The same components are denoted by the same reference numerals, and the names and functions thereof are also the same. Therefore, detailed descriptions of the same components are not repeated.

(Corrected Gear 15)

FIG. 1 is a perspective view showing a corrected gear according to the present embodiment.

A corrected gear 15 includes a gear 10 and an annular inner ring 20. The corrected gear 15 is formed by press fitting the annular inner ring 20 into the gear 10. Here, this figure shows a state before the inner ring 20 is press fitted into the gear 10.

The gear 10 is, for example, a timing gear of an engine, and has an outer circumferential surface 16 (see FIG. 2B) on which a tooth profile 14 is formed and an inner circumferential surface 12. The outer circumferential surface 16 is a circumferential surface corresponding to a tooth bottom of the tooth profile 14, is concentric with the inner circumferential surface 12, and is formed to have a diameter larger than that of the inner circumferential surface 12.

In the present embodiment, the inner circumferential surface 12 of the gear 10 is formed separately from a rotating shaft accommodating surface 18 in which a rotating shaft (not shown) of the gear 10 is accommodated, but the shape is not limited to this, and the shaft accommodating surface 18 may be the same surface as the inner circumferential surface 12.

In the corrected gear 15 according to the present embodiment, two inner rings 20, 20 are press fitted to the inner circumferential surface 12 of the gear 10 from both sides of the gear 10. Here, an outer diameter of the inner ring 20 is formed to be larger than a diameter of the inner circumferential surface 12 of the gear 10.

A material for the gear 10 and a material for the inner rings 20 are not particularly limited and both may be the same material or different materials. However, if the ease of deformation (for example, Young's modulus) of both is greatly different, it is difficult to integrate these during press fitting, which is not preferable. Therefore, it is preferable to use steel materials having approximate Young's moduli for both.

Figure 2A:
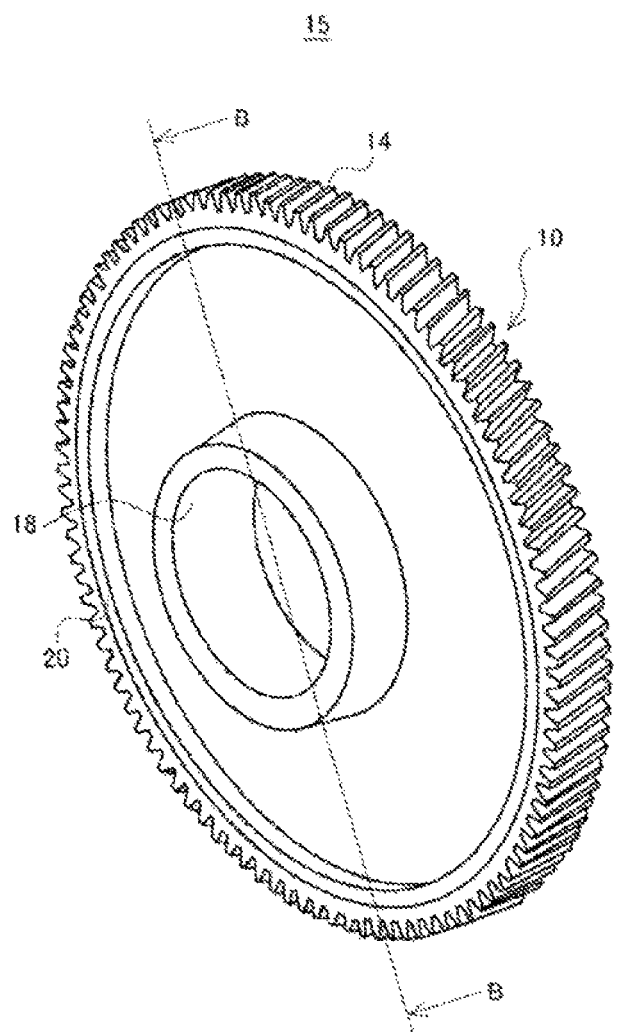
FIG. 2A is a perspective view showing the corrected gear according to the present embodiment.
Figure 2B:
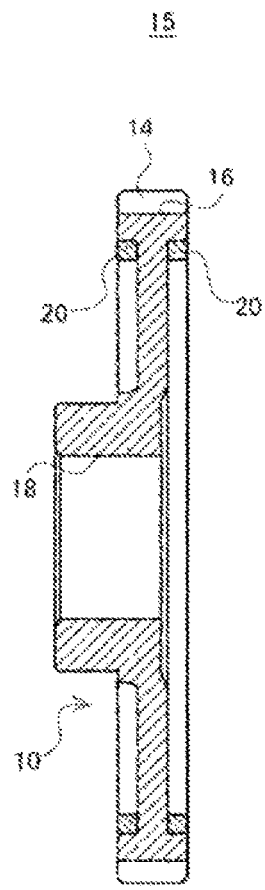
FIG. 2B is a longitudinal sectional view showing the corrected gear according to the present embodiment.

FIG. 2A is a perspective view showing the corrected gear according to the present embodiment. FIG. 2B is a longitudinal sectional view showing the corrected gear according to the present embodiment. These figures show a state after the inner rings 20 are press fitted into the gear 10. FIG. 2B is a sectional view taken along a line B-B in FIG. 2A.

In order to press fit the inner ring 20 having the outer diameter larger than an inner diameter of the inner circumferential surface 12 into the inner circumferential surface 12 of the gear 10, the following method can be considered.

First, there is a method of inserting the inner ring 20 into the gear 10 while applying a force in a press fitting direction at a normal temperature state (hereinafter, referred to as a "simple press fitting method"). This simple press fitting method can be easily performed, but when a difference between the diameter of the inner circumferential surface 12 of the gear 10 and the outer diameter of the inner ring 20 increases, press fitting becomes difficult, and there is a concern that the gear 10 may be damaged.

Next, a "shrinkage fitting method" as another press fitting method will be described.

In this method, the gear 10 is heated at a predetermined temperature to make the diameter of the inner circumferential surface 12 larger than the outer diameter of the inner ring 20, and then, the inner ring 20 is inserted into the inner circumferential surface 12 and cooled.

By expanding the gear 10 by heating and making the diameter of the inner circumferential surface 12 larger than the outer diameter of the inner ring 20, it is possible to easily insert the inner ring 20 into the inner circumferential surface 12 without applying a force to the inner ring 20. After the inner ring 20 is inserted, by cooling, the gear 10 contracts in a state where the gear 10 is pushed and expanded toward an outer side in the circumferential direction by the inner ring 20. Therefore, the inner ring 20 is fitted to the gear 10, and is integrally fixed.

The temperature at which the gear 10 is heated can be set after an amount of expansion in a radial direction is determined in consideration of a thermal expansion coefficient of the material used for the gear 10.

In this method, although a heating device is necessary, there is an advantage that the inner ring 20 can be easily inserted into the gear 10 and the possibility that the gear 10 is damaged is small.

In any of the press fitting methods described above, it is sufficient that the gear 10 is pushed and expanded from an inner side toward an outer side in the radial direction after the press fitting. Further, in the above-described press fitting methods, although the gear 10 is symmetrically expanded by press fitting the two inner rings 20 from both sides of the gear 10, a single inner ring 20 may be press fitted from only one side depending on the shape of the gear 10. In this way, it is possible to manufacture the corrected gear 15 in which the diameter of the outer circumferential surface 16 of the gear 10 is corrected in the radial direction.

Next, before describing a method for correcting gear according to the present embodiment, an OBD calculation method based on a model will be described as a premise thereof.

(OBD Calculation Method Based on Model)

Figure 3:
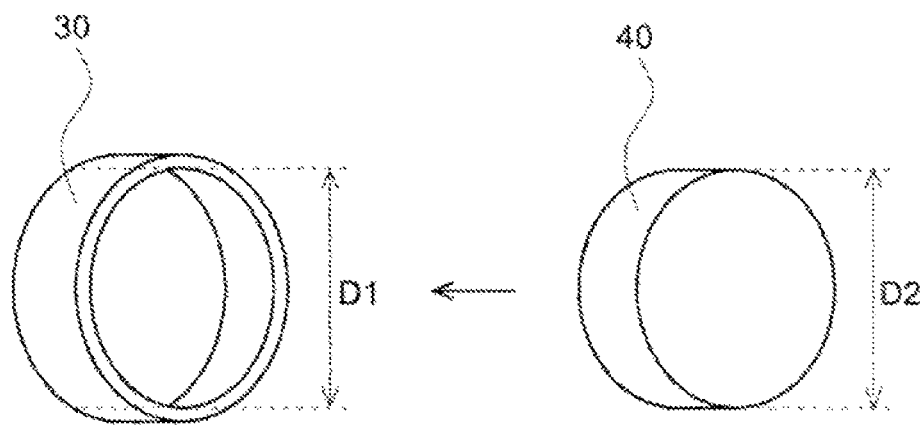
FIG. 3 is a schematic view showing an example of a cylindrical tube body and a shaft body used for OBD calculation based on a model.

FIG. 3 is a schematic view showing an example of a cylindrical tube body and a shaft body used for OBD calculation based on a model.

In the present embodiment, in the OBD calculation based on the model, a cylindrical tube body 30 having an ideal circular tube shape and an inner diameter of D1 corresponding to the gear 10 is assumed. In addition, a shaft body 40 having an ideal cylindrical shape and an outer diameter of D2 corresponding to the inner ring 20 is assumed. Here, it is assumed that the outer diameter D2 of the shaft body 40 on an inserting side is larger than the inner diameter D1 of the cylindrical tube body 30 on an inserted side, that is, D2>D1, and a difference (D2−D1) between D2 and D1 is defined as an "interference".

In the OBD calculation based on a model, values of the Young's modulus, the Poisson's ratio, the inner diameter D1, and an outer diameter of the cylindrical tube body 30 are set in consideration of a material, a dimension, and the like of the gear 10 to be used, and values of the Young's modulus, the outer diameter D2, an insertion length, and the like of the shaft body 40 are set in consideration of a material, a dimension, and the like of the inner ring 20 to be used. Further, when the cylindrical tube body 30 is pushed and expanded by the shaft body 40 with a predetermined interference from the inner side of the cylindrical tube body 30 in an ideal state, a numerical calculation of how much the outer diameter of the outer diameter 30 is expanded is performed. A result of this numerical calculation is shown in FIG. 4.

Figure 4:
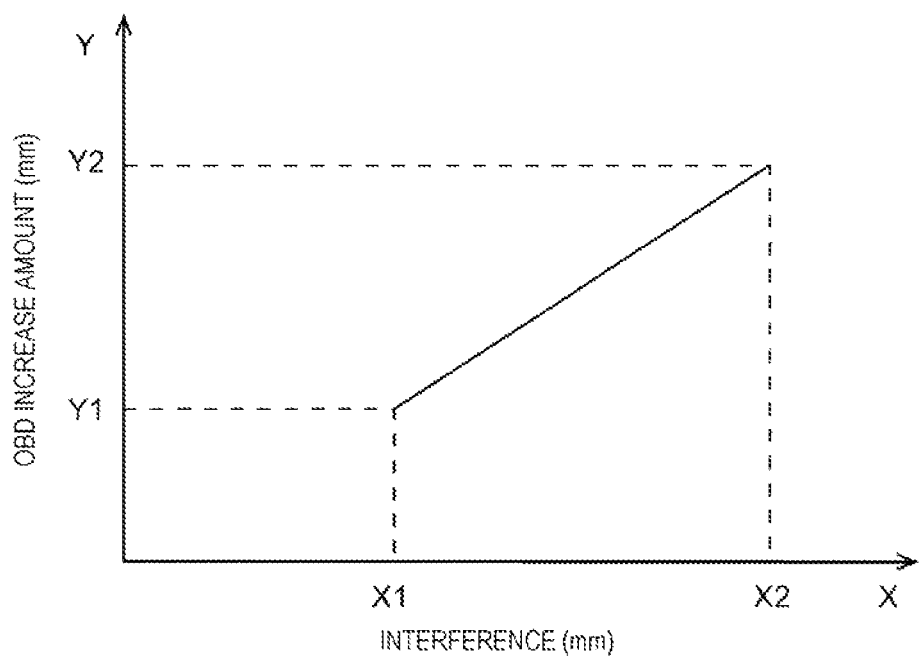
FIG. 4 is a graph showing an example of a relationship between an interference and an OBD increase amount.

FIG. 4 is a graph showing an example of a relationship between an interference and an OBD increase amount. From the result of FIG. 4, as a value of the interference (mm) increases, a value of the OBD increase amount (mm) increases linearly.

Here, the OBD increase amount (mm) when the interference (mm) is X1 is defined as an OBD minimum increase amount Y1, and the OBD increase amount (mm) when the interference (mm) is X2 is defined as an OBD maximum increase amount Y2.

As a result of the OBD calculation based on a model using the values corresponding to the gear 10 and the inner ring 20 described above with X1 set to 0.040 mm and X2 set to 0.100 mm, for example, the OBD minimum increase amount Y1 is +0.019 mm, and the OBD maximum increase amount Y2 is +0.051 mm.

On the other hand, in a case of the gear 10 alone, an OBD deviation value is, for example, 0 mm to −0.07 mm due to variations in manufacturing conditions, and has a predetermined range on a negative side. Here, the "OBD deviation value" means a value of deviation of an OBD measurement value from a set OBD target value, and the "negative side" means that the OBD measurement value is smaller than the OBD target value.

In the present embodiment, in a case where there are a plurality of gears 10 with negative OBD deviation values, the OBD maximum increase amount due to press-fitting deformation is determined in advance by OBD calculation based on a model, and press fitting is performed on a gear whose OBD deviation value is further on the negative side than a value obtained by making the OBD maximum increase amount negative. Then, the OBD deviation value is moved to a positive side by increasing the OBD to the positive side by an amount corresponding to the OBD increase amount by press fitting, and a variation in the OBD is reduced.

When described in detail based on the above example, in case where there are the plurality of gears 10 having a predetermined OBD deviation value range (0 mm to −0.07 mm) on the negative side, the OBD maximum increase amount Y2 due to the press-fitting deformation is determined in advance by the OBD calculation based on a model, and is set as the OBD maximum increase amount Y2 (+0.051 mm). With respect to a gear 10 with an OBD deviation value in a range further on the negative side than a value (−0.051 mm) obtained by making the OBD maximum increase amount Y2 (+0.051 mm) negative (that is, −0.07 mm to 0.051 mm (however, −0.051 mm is not included)), the inner ring 20 is press fitted to move (increase) the OBD deviation value to the positive side. Hereinafter, a method for correcting gear according to the present embodiment using the OBD calculation based on a model will be described.

Figure 5:
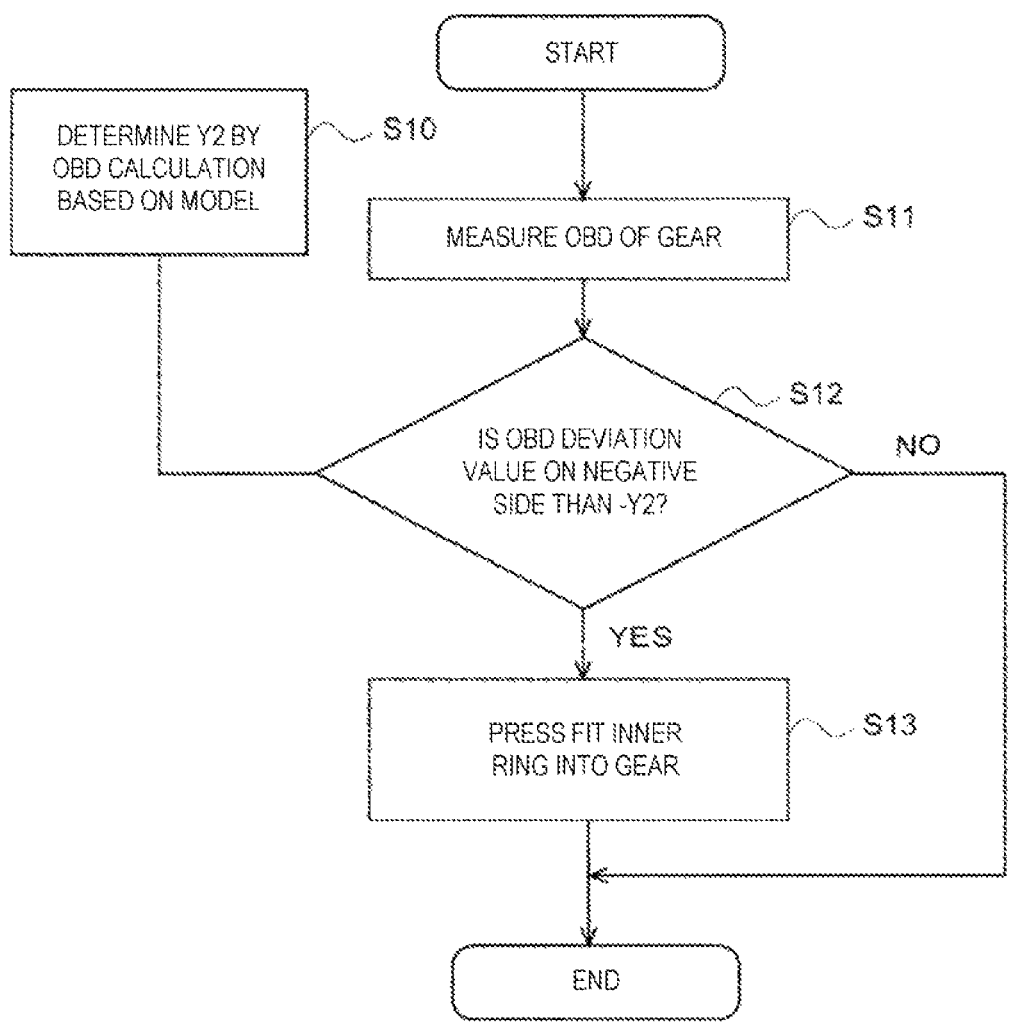
FIG. 5 is a flowchart showing a procedure of a method for correcting gear according to the present embodiment.

(Method for Correcting Gear) FIG. 5 is a flowchart showing a procedure of a method for correcting gear according to the present embodiment. In this method, the OBD calculation using a model is performed in advance based on the characteristics of the gear 10 and the inner ring 20, and the OBD maximum increase amount Y2 is determined (step S10).

Next, OBD of the gear 10 is measured to obtain the OBD deviation value (step S11). The measurement of the OBD can be performed by a known measurement method.

Further, it is determined whether or not the OBD deviation value is on the negative side than −Y2 (step S12). When the OBD deviation value is on the negative side than −Y2 (YES in step S12), the inner ring 20 is press fitted into the gear 10 (step S13). On the other hand, when the OBD deviation value is not on the negative side than −Y2 (NO in step S12), the inner ring 20 is not press fitted into the gear 10, and the process ends.

According to the OBD calculation based on the model, the OBD of the gear 10 increases by 0.019 mm to 0.051 mm by press fitting the inner ring 20 in an interference range of 0.040 mm to 0.100 mm. Therefore, among the plurality of gears 10 with OBD deviation values in a range of 0 mm to −0.07 mm, the effect in a case where the press fitting is performed not on all gears 10 but only on a gear 10 with the OBD deviation value on the negative side than −0.051 mm will be verified.

First, a case where the OBD deviation value is −0.07 mm (in a case where the deviation from the target value is maximum and in a case of press fitting), the OBD moves (increases) toward the positive side by 0.019 mm to 0.051 mm by press fitting the inner ring 20 in the range of the interference, and a range of the OBD deviation value becomes −0.051 mm to −0.019 mm.

Next, a case where the OBD deviation value is −0.051 mm (in a case where the deviation from the target value is minimum and in the case of press-fitting) will be described. Here, in the present embodiment, since the press fitting is performed in a case where the OBD deviation value is on the negative side than −0.051 mm, to be exact, the press fitting is not performed in a case where the OBD deviation value is −0.051 mm. However, such case will be explained for convenience. By the press fitting, the range of the OBD deviation value moves (increases) to the positive side by 0.019 mm to 0.051 mm, and the range of the OBD deviation value becomes −0.032 mm to 0 mm.

That is, when the OBD deviation value of the gear 10 is on the negative side than −0.051 mm, by adjusting the interference within a range of 0.040 mm to 0.100 mm and performing press fitting, the range of the OBD deviation value of the gear 10 can be optionally corrected in a range of −0.051 mm to 0 mm.

On the other hand, when the OBD deviation value of the gear 10 is not on the negative side than −0.051 mm, that is, when the range of the OBD deviation value is −0.051 mm to 0 mm, the OBD deviation value is originally small and is within a reduction range of the range of the OBD deviation value due to press fitting, and therefore, the efficiency of the work can be improved by omitting the press fitting process.

As described above, according to the method for correcting gear using the OBD calculation based on a model, the range of the OBD deviation value can be finally reduced to a range of 0 mm to −0.051 mm. That is, the range of the OBD deviation value which is 70 μm with the gear 10 alone can be reduced to 51 μm by press fitting the inner ring 20. Therefore, variation in the OBD of the gear 10 can be reduced.

Effects of Present Embodiment

The corrected gear 15 according to the present embodiment includes the gear 10 having the outer circumferential surface 16 on which the tooth profile 14 is formed and the inner circumferential surface 12, and the inner ring 20 press fitted to the inner circumferential surface 12 of the gear 10. For this reason, the gear 10 can be corrected in the radial direction by press-fitting deformation, and therefore, the variation in the OBD can be reduced.

Further, by using the annular inner ring 20 having the outer diameter larger than the diameter of the inner circumferential surface 12, the gear 10 is heated at a predetermined temperature to make the diameter of the inner circumferential surface 12 larger than the outer diameter of the inner ring 20, and then, the inner ring 20 is inserted into the inner circumferential surface 12 and cooled, so that the inner ring 20 can be easily inserted into the gear 10. In addition, it is possible to reduce the possibility that the gear 10 is damaged.

Furthermore, in the method for correcting gear according to the present embodiment, in a case where there are a plurality of gears 10 whose OBD deviation value is negative, the OBD maximum increase amount due to press-fitting deformation is determined in advance by OBD calculation based on a model, and press fitting of the inner ring 20 is performed to a gear 10 whose OBD deviation value is further on the negative side than a value obtained by making the OBD maximum increase amount negative. Therefore, the variation in the OBD can be reduced, and the work efficiency can be reduced.

As described above, the variation of a gear backlash can be reduced by press fitting the inner ring 20 and adjusting the OBD to reduce the variation. Therefore, gear tooth rattling noise can be reduced, which leads to noise reduction.

Other Embodiments

While an embodiment of the present disclosure has been described above, the embodiment has been presented by way of example only, and is not intended to limit the scope of the inventions. The embodiment can be implemented in other various forms, and various omissions, substitutions, and changes can be made without departing from the gist of the present disclosure. The embodiment and modifications thereof are included in the scope of the invention or the gist thereof, and are included in a scope equivalent to the invention described in the claims.

For example, in the above-described embodiment, an example of a timing gear of an engine is shown as the gear 10. However, the shape of the gear 10 is not particularly limited, and the gear 10 may be not only a spur gear having a simple annular shape, but also be a helical gear, a bevel gear, a spiral bevel gear, a screw gear, a miter gear, or the like.

In addition, in the above-described embodiment, an example in which the annular inner ring 20 is press fitted is described. However, the inner ring 20 may be not only an annular shape, but also be an annular body having a polygonal shape. Further, a shaft, a cylinder, or the like may be press fitted in consideration of the shape, the function, or the like of the gear 10.

The present application is based on Japanese Patent Application (No. 2018-183445) filed on Sep. 28, 2018, contents of which are incorporated herein as reference.

INDUSTRIAL APPLICABILITY

The corrected gear and the method for correcting gear according to the present disclosure are useful in that variation in OBD of a gear can be reduced.

REFERENCE SIGNS LIST 10 gear
12 inner circumferential surface
14 tooth profile
15 corrected gear
16 outer circumferential surface
20 inner ring (insert)
30 cylindrical tube body
40 shaft body

The invention claimed is:

1. A corrected gear comprising:
  a gear including:
    a gear body having a shape of a circular plate;
    an outer circumferential surface on which a tooth profile is formed; and
    an inner circumferential surface located beneath the outer circumferential surface and being connected to the gear body; and
  a ring-shaped insert that is provided separately from the gear and corrects a diameter of the outer circumferential surface of the gear in a radial direction by being press fitted into the inner circumferential surface of the gear.

2. The corrected gear according to claim 1, wherein the ring-shaped insert is an annular inner ring having an outer diameter larger than a diameter of the inner circumferential surface.

3. A method for correcting gear, the method comprising:
  with respect to a gear including:
    a gear body having a shape of a circular plate;
    an outer circumferential surface on which a tooth profile is formed; and
    an inner circumferential surface located beneath the outer circumferential surface and being connected to the gear body,
  correcting a diameter of the outer circumferential surface of the gear in a radial direction by press fitting, into the inner circumferential surface, an annular inner ring having a ring shape and an outer diameter larger than a diameter of the inner circumferential surface.

4. The method for correcting gear according to claim 3, wherein in the press fitting, the gear is heated at a predetermined temperature to make the diameter of the inner circumferential surface larger than the outer diameter of the inner ring, and then, the inner ring is inserted into the inner circumferential surface and cooled.

5. The method for correcting gear according to claim 3, wherein, in a case where there are a plurality of gears whose over ball diameter (OBD) deviation value, which is a value of deviation of an OBD measurement value from a set OBD target value, is negative, an OBD maximum increase amount due to press-fitting deformation is determined in advance by OBD calculation based on a model, and the press fitting is performed to a gear whose OBD deviation value is further on a negative side than a value obtained by making the OBD maximum increase amount negative.

6. The method for correcting gear according to claim 4, wherein, in a case where there are a plurality of gears whose over ball diameter (OBD) deviation value, which is a value of deviation of an OBD measurement value from a set OBD target value, is negative, an OBD maximum increase amount due to press-fitting deformation is determined in advance by OBD calculation based on a model, and the press fitting is performed to a gear whose OBD deviation value is further on a negative side than a value obtained by making the OBD maximum increase amount negative.

* * * * *